United States Patent
Zierolf (10) Patent No.: US 6,711,488 B2
(45) Date of Patent: Mar. 23, 2004

(54) WHEEL DECELERATION-BASED ANTISKID BRAKE CONTROLLER WITH ADAPTIVE DECELERATION THRESHOLD

(75) Inventor: Michael Lee Zierolf, Vandalia, OH (US)

(73) Assignee: Goodrich Corporation, Charlotte, NC (US)

( * ) Notice: Subject to any disclaimer, the term of this patent is extended or adjusted under 35 U.S.C. 154(b) by 55 days.

(21) Appl. No.: 10/153,513

(22) Filed: May 22, 2002

(65) Prior Publication Data
US 2003/0220731 A1 Nov. 27, 2003

(51) Int. Cl.$^7$ .................................................. B60T 8/32
(52) U.S. Cl. ................................................ 701/71; 303/121
(58) Field of Search ........................ 701/71, 70, 75, 701/79; 303/138, 139, 167, 176, 126, 121

(56) References Cited

U.S. PATENT DOCUMENTS

| | | | |
|---|---|---|---|
| 4,043,607 A | 8/1977 | Signorelli et al. ........... 303/100 |
| 4,078,845 A | 3/1978 | Amberg et al. .............. 303/107 |
| 4,653,816 A | 3/1987 | Lin .............................. 303/106 |
| 4,679,866 A | 7/1987 | van Zanten et al. ........ 303/104 |
| 4,715,662 A | 12/1987 | van Zanten et al. ........ 303/109 |
| 4,764,871 A | 8/1988 | van Zanten .................. 364/426 |
| 4,933,858 A | 6/1990 | Matsuda ................. 364/426.02 |
| 5,050,940 A | 9/1991 | Bedford et al. ............. 303/100 |
| 5,072,393 A | 12/1991 | Mori et al. ............. 364/426.02 |
| 5,117,361 A | 5/1992 | Takayama et al. ..... 364/426.02 |
| 5,180,214 A | 1/1993 | Yeh et al. .................... 303/111 |
| 5,281,009 A | 1/1994 | Kidston et al. ............. 303/100 |
| 5,371,677 A | 12/1994 | Ehret et al. ............. 364/426.02 |
| 5,424,942 A | 6/1995 | Dong et al. ................. 364/164 |
| 5,454,630 A | 10/1995 | Zhang ......................... 303/175 |
| 5,551,769 A | 9/1996 | Luckevich ................... 303/149 |
| 5,615,932 A * | 4/1997 | Okazaki ...................... 303/121 |
| 5,713,642 A | 2/1998 | Okazaki ...................... 303/121 |
| 5,719,565 A | 2/1998 | Tsuno et al. ................. 340/905 |
| 5,918,951 A | 7/1999 | Rudd, III ..................... 303/150 |
| 5,951,122 A | 9/1999 | Murphy ....................... 303/163 |
| 6,135,578 A * | 10/2000 | Clar et al. ................ 303/114.3 |
| 6,178,370 B1 | 1/2001 | Zierolf ......................... 701/171 |

FOREIGN PATENT DOCUMENTS

| | | |
|---|---|---|
| DE | 2123904 | 2/1971 |
| DE | 30 39 574 A1 | 6/1982 |
| EP | 0 936 116 A2 | 8/1999 |
| WO | 95/26287 | 10/1995 |

OTHER PUBLICATIONS

Mark L. Akey, Fuzzy Logic, Anti–Skid control for Commercial Trucks: Magnavox Decision Support Systems Applied Center of Excellence, Fort Wayne, Indiana, SPIE vol. 2493, Mar. 1995, pp. 359–370.

Hutchinson et al., "Applications of Minimum Variance Reduced–State Estimators", IEEE Transactions on Aerospace and Electronic Systems; Sep. 1975; pp. 785–794.

du Plessis, "Poor Man's Explanation of Kalman Filtering", Autonetics Division, Rockwell International; date unknown.

Kobayashi et al., Estimation of Absolute Vehicle Speed Using Fuzzy Logic Rule–Based Kalman Filter Proceedings of the American Control Conference; Jun. 1995.

International Search Report dated Sep. 11, 2003 in relation to the patent application No. PCT/US03/16129.

* cited by examiner

*Primary Examiner*—Marthe Y. Marc-Coleman
(74) *Attorney, Agent, or Firm*—Renner, Otto, Boisselle & Sklar, LLP (57) ABSTRACT

An antiskid brake controller utilizes measured wheel speed to provide brake control for a vehicles, such as an aircraft. The antiskid brake controller controls a braking operation of a wheel of a vehicle based on a wheel speed signal provided by a wheel speed sensor coupled to the wheel. The antiskid brake controller includes a deceleration threshold generator that selects a deceleration threshold based on the ability of the wheel to hold a pilot commanded brake pressure without excessive skidding. The deceleration threshold is a function of a wheel speed reference signal $\omega_{ref}$.

11 Claims, 5 Drawing Sheets

WHEEL DECELERATION-BASED ANTISKID BRAKE CONTROLLER WITH ADAPTIVE DECELERATION THRESHOLD

TECHNICAL FIELD

The present invention relates generally to brake control systems, and more particularly to an improved wheel deceleration-based antiskid brake controller with adaptive deceleration threshold.

BACKGROUND ART

Antiskid brake controllers have been in widespread use for many years. In the simplest sense, an antiskid brake controller compares the speed of a vehicle (e.g., automobile, aircraft, etc.) derived from a wheel speed sensor to the vehicle speed derived from a secondary or reference source. If the wheel is determined to be skidding an excessive amount, then brake pressure applied to the wheel is released and the wheel is allowed to spin back up to the appropriate speed.

A fundamental problem associated with virtually all antiskid brake controllers relates to determining an appropriate amount of skidding. Two types of controllers that are generally known utilize different techniques. The first type of antiskid controller is deceleration-based. In short, the deceleration-based controller differentiates the wheel speed to determine how fast the wheel speed is changing. If the wheel decelerates too quickly, there is said to be excessive skidding and the controller reduces the amount of pressure transmitted to the brakes.

A second type of antiskid controller relies on a model of the mu-slip curve that describes the tire-to-road surface friction characteristics. The difference between the wheel velocity and the vehicle velocity is referred to as the slip velocity. The slip velocity is compared with a predefined set point on the mu-slip curve in order to achieve a desired amount of skidding.

Antiskid controllers that are based on the mu-slip curve are oftentimes computationally complex and require multiple sensors for measuring wheel speed, vehicle speed, etc. Consequently, deceleration-based antiskid controllers may be preferred as a simpler approach. However, deceleration-based antiskid controllers in the past have not been sufficiently adaptive to adjust to varying tire/surface conditions (e.g., wet or icy conditions) insofar as determining an acceptable amount of skidding. Failure to adjust for varying conditions can result in the antiskid controller prematurely releasing brake pressure and/or failing to adequately control excessive skidding.

In view of the aforementioned problems associated with conventional antiskid brake controllers, there is a strong need in the art for an antiskid controller which is adaptive to handle changing tire/surface conditions. In addition, there is a strong need for such an antiskid controller which is not computationally intensive and which does not require multiple sensors, etc.

U.S. Pat. No. 6,178,370 issued to Michael L. Zierolf successfully addressed the above-identified issues. The disclosure of U.S. Pat. No. 6,178,370 is incorporated herein by reference in its entirety. Michael L. Zierolf, also the Inventor of the present invention, has made improvements on the invention disclosed in U.S. Pat. No. 6,178,370 and discloses those improvements below.

SUMMARY OF THE INVENTION

The antiskid brake controller of the present invention utilizes measured wheel speed in order to provide brake control for a vehicle, such as an aircraft. The measured wheel speed is differentiated to determine the deceleration of the wheel (deceleration signal $\omega'$). The measured wheel speed is also used to determine a reference wheel speed (wheel speed reference signal $\omega_{ref}$). The reference wheel speed (wheel speed reference signal $\omega_{ref}$) is the estimated speed of the vehicle. The antiskid controller uses the wheel speed reference signal $\omega_{ref}$ to determine a predefined deceleration threshold. The predefined deceleration threshold is the maximum deceleration the wheel can hold without incurring excessive skidding. The antiskid brake controller compares the deceleration signal $\omega'$ to the predefined deceleration threshold. If the wheel decelerates faster than the predefined deceleration threshold, the antiskid brake controller reduces the pilot commanded pressure provided to the brakes by a scaling factor. As the wheel begins to decelerate at a rate less than the predefined deceleration threshold, the pilot commanded pressure is increased until full pilot commanded pressure is otherwise applied. Thus, the antiskid brake controller is capable of operating based only on measured wheel speed. Consequently, additional sensors are not necessary. An optical encoder, for example, located at the wheel itself may generate the measured wheel speed signal.

As mentioned above, the predefined deceleration threshold is a function of the wheel speed reference signal $\omega_{ref}$. The antiskid brake controller selects the predefined deceleration threshold based on the ability of the wheel to hold the pilot commanded brake pressure without excessive skidding. Excessive skidding is considered to be when the wheel decelerates too quickly. Excessive skidding may be determined in a deceleration-based controller by differentiating the wheel speed to determine how fast the wheel speed is changing, for example. The predefined deceleration threshold values are predetermined based on the desired response characteristics of the antiskid brake controller. To reduce computational complexity, the predefined deceleration threshold are contained in a look-up table. The look-up table values are chosen by trial and error, much in the same way that the proportional and integral gains of a traditional PI controller are determined. That is, a mathematical model of the aircraft and a landing scenario are used to do an evaluation of a particular set of deceleration thresholds DTs. For example, if the simulation shows excessive, repeated skidding at a particular aircraft speed, the deceleration threshold DT is reduced for the corresponding wheel speed reference signal $\omega_{ref}$. Conversely, if braking is slow to respond and efficiency is lost at a particular aircraft speed, the deceleration threshold DT for the corresponding wheel speed reference signal $\omega_{ref}$ is increased. In general, higher deceleration thresholds are required for higher wheel speed reference signals $\omega_{ref}$.

The antiskid controller adapts to varying runway conditions. For example, the antiskid controller adjusts the deceleration threshold downward in the event an icy or wet runway surface is encountered. Upon re-encountering a dry or normal runway surface, the antiskid controller increases the deceleration threshold (allows the deceleration threshold to return to normal conditions). The antiskid controller uses the output of the antiskid controller to determine when to use a lower set of gains appropriate for and icy or wet runway surface.

The antiskid brake controller also includes a proportional gain module. Proportional gain is added to the antiskid brake controller to improve its response.

In addition, the antiskid brake controller provides a partial reset of a system integrator in the event of a skid condition.

When a skid occurs during a braking operation, pressure to the brake is dumped or released. Further, the antiskid brake controller resets the system integrator to a tunable constant. The tunable constant may be determined a priori. The tunable constant may be seventy-five percent (75%) of the output prior to the occurrence of the skid, for example. Also, resetting the system integrator to a percentage of the output prior to the occurrence of the skid increases response by not having to restart at zero (0) output. This partial reset prevents excessive brake pressure from being applied to the wheel immediately following the skid, thereby prolonging the skidding event.

Additionally, the antiskid controller includes hysteresis in the pressure dump logic. Such hysteresis involves changing the gain in the pressure dump logic between that used to determine a skid event and that used to determine when to reset the controller following a dump condition. By introducing such hysteresis, it is possible to insure that the wheel spins back up to synchronous with the actual vehicle speed before brake pressure is reapplied.

Further, the output of the antiskid controller is used in the brake controller as an upper limit. By using the output of the antiskid controller as an upper limit of the brake controller, the antiskid controller prevents the brake controller from diverging.

According to one particular aspect of the invention, an antiskid brake controller is provided for controlling a braking operation of a wheel of a vehicle based on a wheel speed signal provided by a wheel speed sensor coupled to the wheel. The antiskid brake controller includes a deceleration threshold generator that selects a deceleration threshold based on the ability of the wheel to hold a pilot commanded brake pressure without excessive skidding. The deceleration threshold values of deceleration threshold generator are contained in a look-up table.

According to another aspect of the invention, an antiskid brake controller adaptive to a surface condition is provided for controlling a braking operation of a wheel of a vehicle based on a wheel speed signal provided by a wheel speed sensor coupled to the wheel. The antiskid brake controller includes a reduced integral gain control. An output of the reduced integral gain control increases or decreases the deceleration threshold as a function of the surface condition.

According to another aspect of the invention, an antiskid brake controller is provided for controlling a braking operation of a wheel of a vehicle based on a wheel speed signal provided by a wheel speed sensor coupled to the wheel. The antiskid brake controller includes a proportional gain block to scale the signal output by a proportional amount. The output of the proportional gain block is added to an output of the antiskid brake controller to increase a response time of the antiskid brake controller to allow increased scaling of the brake control $T_{output}$ and thus improved antiskid control.

According to another aspect of the invention, an antiskid brake controller is provided for controlling a braking operation of a wheel of a vehicle based on a wheel speed signal provided by a wheel speed sensor coupled to the wheel. The antiskid brake controller includes a reset circuit. The reset circuit resets the output of the antiskid controller to a percentage of the output of the antiskid controller prior to a wheel lock-up condition in order to prevent excessive brake pressure from being applied to a wheel.

According to another aspect of the invention, an antiskid brake controller is provided for controlling a braking operation of a wheel of a vehicle based on a wheel speed signal provided by a wheel speed sensor coupled to the wheel. The antiskid brake controller includes a hysteresis in a pressure "dump" circuit. The hysteresis is used to determine when to reset the antiskid controller after a wheel lock-up event has occurred. Thus, the hysteresis allows the wheel to spin back up to synchronous before resetting the antiskid controller.

To the accomplishment of the foregoing and related ends, the invention, then, comprises the features hereinafter fully described and particularly pointed out in the claims. The following description and the annexed drawings set forth in detail certain illustrative aspects of the invention. However, these aspects are indicative of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

These and further features of the present invention will be apparent with reference to the following description and drawings, wherein.

DISCLOSURE OF INVENTION

In the detailed description that follows, identical components have been given the same reference numerals. To illustrate the present invention in a clear and concise manner, the drawings may not necessarily be to scale and certain features may be shown in a partial schematic format.

Figure 1:
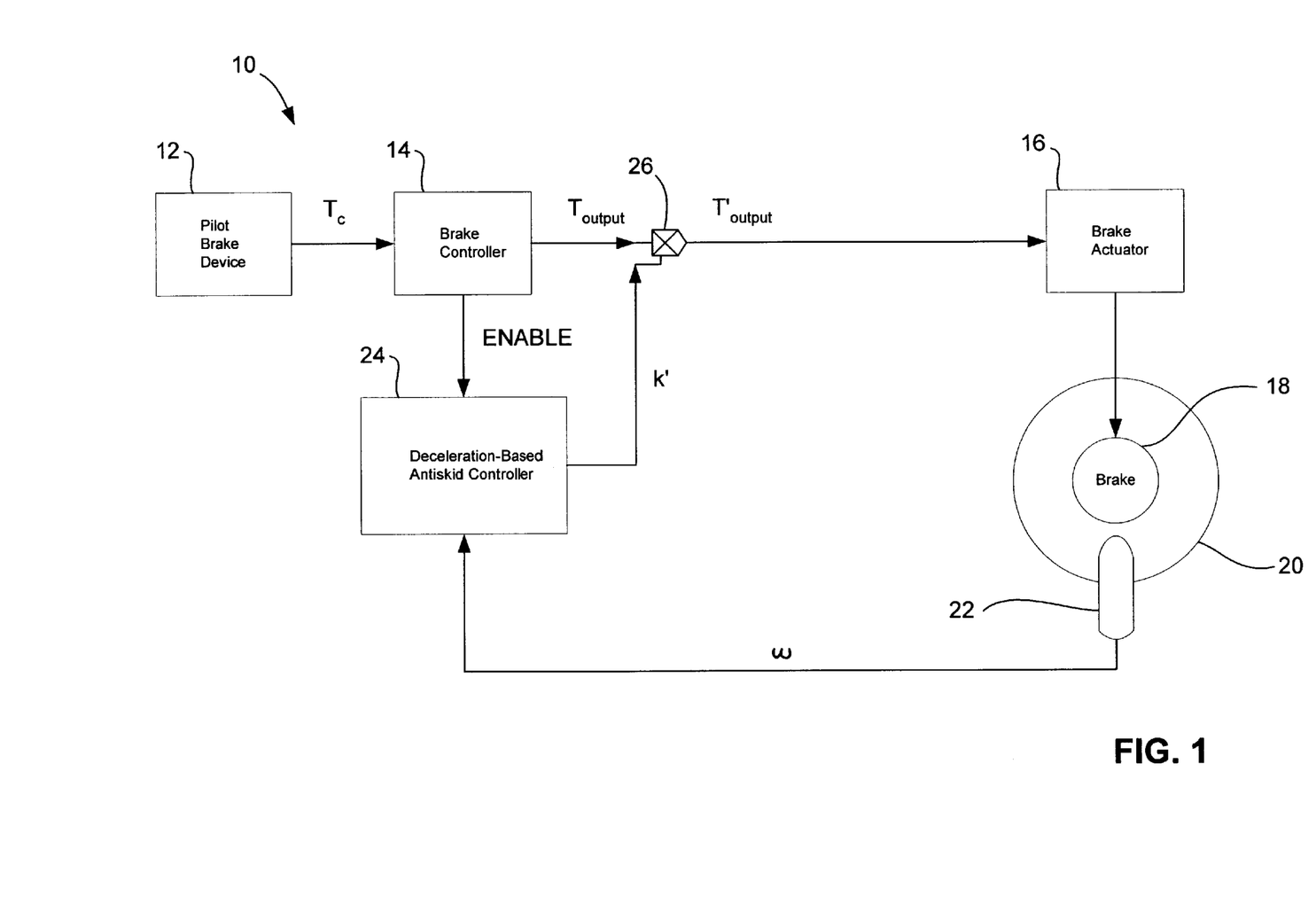
FIG. 1 is a block diagram of a brake system including a deceleration-based antiskid controller with an adaptive deceleration threshold in accordance with the present invention.

Referring initially to FIG. 1, a brake control system as used in an aircraft in accordance with the present invention is generally designated 10. Generally speaking, brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair, there is a right wheel control and left wheel control.

The left and right wheel control functions are uncoupled except for locked wheel protection. The basic unit therefore consists of a control for a single wheel that can be left or right. As utilized herein, it will be appreciated that the term "wheel" is intended to refer collectively to both the wheel and tire.

For sake of simplicity, the brake control system 10 (hereinafter system 10) as shown in FIG. 1 represents the basic unit for providing brake control of a single wheel (left or right). However, it will be appreciated that control for the other wheel(s) can be provided via a corresponding system(s) 10 or in a single system incorporating the same inventive principles. Moreover, the present invention as described provides brake control in connection with an aircraft. Nevertheless, it will be appreciated that the brake control system 10 with an antiskid controller according to the present invention has utility for virtually any type of vehicle and is not limited necessarily to brake control for aircraft.

The system 10 includes a pilot brake device 12 for providing operator or pilot commanded brake control. In addition, the system 10 includes a conventional brake controller 14. The brake controller 14 is designed to provide a brake control signal $T_{output}$ ultimately to a brake actuator 16 included in the system 10. The brake actuator 16 may be any conventional type actuator (e.g., hydraulic, pneumatic or electromechanical) for applying pressure to a brake material (not shown) in a brake assembly 18. The brake assembly 18 in turn provides braking action to a wheel 20 by exerting a braking torque or force on the wheel 20 as is conventional. The wheel 20 is coupled to the aircraft (or other vehicle) via a conventional structure (not shown).

The system 10 further includes a wheel speed sensor 22 that measures the angular velocity or speed of the wheel 20. The wheel speed sensor 22 may be any conventional sensor (e.g., optical encoder based, etc.) that provides an output signal (i.e., measured wheel speed signal ω) indicative of the measured speed of the wheel 20.

The measured wheel speed signal ω is input to a deceleration-based antiskid controller 24 included in the system 10. As will be discussed in detail below, the antiskid controller 24 estimates the deceleration of the wheel 20 by differentiating (with respect to time) the measured wheel speed signal ω provided from the wheel speed sensor 22. The antiskid controller 24 then compares the wheel deceleration signal ω' to a predefined deceleration threshold. Based on the comparison, the antiskid controller 24 outputs an antiskid control signal k' which varies in value from "0" to "1". The antiskid control signal k' is output by the antiskid controller 24 to a multiplier 26 that multiplies the brake control signal $T_{output}$ by the value of the antiskid control signal k'. The resultant modified brake control signal $T'_{output}$ is output by the multiplier 26 to the brake actuator 16. The brake actuator 16 consequently applies a braking force to the wheel 20 based on the modified brake control signal $T'_{output}$.

As will be described more fully below in relation to FIGS. 2–4, the antiskid controller 24 effectively controls the pilot commanded pressure applied to the brake assembly 18. For example, if the wheel 20 decelerates faster than the aforementioned predefined deceleration threshold, the antiskid controller 24 reduces the value of the antiskid control signal k'. In the event the wheel 20 decelerates at a rate that is slower than the predefined deceleration threshold, the antiskid control signal k' will increase towards "1" until full pilot commanded pressure is applied to the brake assembly 18.

In addition, the antiskid controller 24 is adaptive in the sense that it varies the predefined deceleration threshold based on the ability of the wheel 20 to hold a given amount of deceleration without excessive skidding. For example, the antiskid controller 24 decreases the deceleration threshold by a scaling factor in the event an icy or wet runway surface is encountered. Subsequently, the antiskid controller 24 increases the deceleration threshold upon re-encountering a dry or normal runway surface.

Additionally, the antiskid brake controller 24 also provides a proportional gain module. The proportional gain module provides a scaling factor or gain to improve the response of the brake controller. The application of the proportional gain will be discussed in detail below.

The antiskid controller 24 also provides a partial reset of the system integrator in the event of a skid. The antiskid controller 24 resets the system integrator to a percentage of the output prior to the skidding event. The operation of the antiskid controller 24 during a skidding event will be further discussed in detail below.

Further, the antiskid controller 24 includes hysteresis in the pressure dump logic. The hysteresis is used to determine when to reset the antiskid controller 24 following a dump condition. The antiskid controller 24 uses a higher gain to determine when to reset the antiskid controller 24 (i.e., the DUMP-bar signal) to preskid values. The higher gain allows the wheel 20 to spin back up to synchronous before brake pressure is reapplied to the wheel 20.

The antiskid controller 24 receives an ENABLE signal from the brake controller 14 so as to activate the antiskid controller 24 during a braking event (e.g., activation of the pilot brake device 12). During a braking event as determined by activation of the pilot brake device 12, the brake controller 14 provides an active ENABLE signal (i.e., a logic "1") to the antiskid controller 24. During a non-braking event when the pilot brake device 12 is not activated, the ENABLE signal is set to a logic "0".

Generally describing the operation of the system 10, the pilot brake device 12 comprises a pedal or equivalent thereof. During a braking event, the pilot of the aircraft activates the pilot brake device 12 by pushing the pedal (or its equivalent). The depression of the pedal is converted to an electrical signal (brake torque command signal $T_c$) that is provided to the brake controller 14. The value of the brake torque command signal $T_c$ is indicative of the degree of depression of the pedal, and is related to the amount of braking force commanded by the pilot as is conventional. The brake controller 14 receives the brake torque command signal $T_c$ and outputs the brake control signal $T_{output}$ that is related to the brake torque command signal $T_c$. It will be appreciated that the brake control signal $T_{output}$ will be a pressure signal for a hydraulic brake or a force signal for an electric brake, for example. Concurrently, the brake controller 14 enables the antiskid controller 24 via the ENABLE signal. The brake control signal $T_{output}$ is provided to one input of the multiplier 26 that multiplies the brake control signal by the antiskid control signal k' provided by the antiskid controller 24 to the other input of the multiplier 26.

As mentioned above, the modified brake control signal $T'_{output}$ is input to the brake actuator 16. The brake actuator 16 in turn applies pressure to the brake assembly 18 based on the modified brake control signal $T'_{output}$ in an otherwise conventional manner. The applied brake pressure results in a reduction in the rotational speed of the wheel 20 which is measured by the wheel speed sensor 22 and fed back to the antiskid controller 24. Thus, the present invention provides closed loop brake control based on the deceleration of the wheel 20. In the exemplary aspect, the only input parameter is wheel speed, thus eliminating the need for additional sensors that add to complexity and cost.

Figure 2:
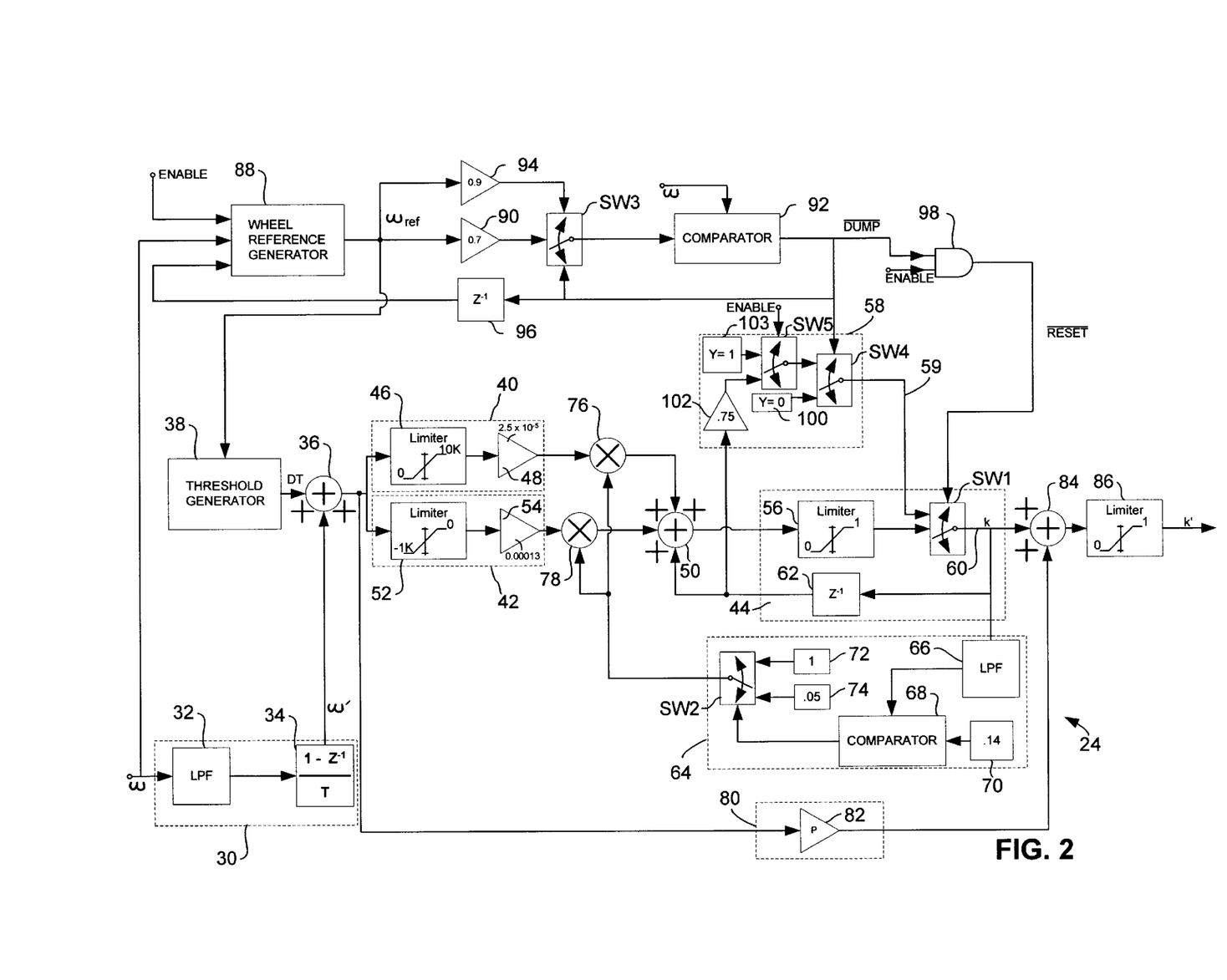
FIG. 2 is a detailed block diagram of the deceleration-based antiskid controller in accordance with the exemplary aspect of the present invention.

Referring now to FIG. 2, a detailed block diagram of the deceleration-based antiskid controller 24 is shown. As will be appreciated, the antiskid controller 24 in the exemplary aspect is a digital controller represented as operating in the z-domain. The measured wheel speed signal ω from the wheel speed sensor 22 is sampled at a rate of 800 samples per second, for example, although clearly other sampling rates could be used. Moreover, other digital or analog control techniques are possible and the precise implementation described herein should not be construed as limiting in scope.

As represented in FIG. 2, the measured wheel speed signal ω is input to a wheel speed filter/differentiator 30 included in the antiskid controller 24. The output (i.e., the deceleration signal ω') of the wheel speed filter/differentiator 30 represents the deceleration of the wheel 20. The wheel speed filter/differentiator 30 includes, for example, a first order, low-pass filter 32 with a cut-off frequency of 10 radians/second (rad/sec). The measured wheel speed signal ω is input to the low-pass filter 32 to remove any noise that is present in the measured wheel speed signal ω. Preferably, the low-pass filter 32 is designed so as not to introduce excess lag into the system, as response time in antiskid controllers is essential.

The filtered output from the low-pass filter 32 is then input to a differentiator 34 included in the wheel speed filter/differentiator 30. The differentiator 34 determines the time derivative of the measured wheel speed signal ω. As is known, the time derivative of the measured wheel speed signal ω corresponds to the acceleration (or deceleration) of the wheel 20. In the exemplary aspect, for ease of implementation and low computational burden, a rectangular finite-difference approximation differentiator constitutes the differentiator 34. For example, the differentiator 34 may have a transfer function of $(1-Z^{-1})/T$, where T represents the sampling period. However, improved accuracy may be obtained with more sophisticated differentiators.

The deceleration signal ω' is provided to an input of an adder 36 included in the antiskid controller 24. A deceleration threshold DT signal from a threshold generator 38 included in the antiskid controller 24 is provided as an input to the other input of the adder 36. The adder 36 compares the deceleration threshold DT signal to the deceleration signal ω'. Based on such comparison, antiskid brake control is provided.

Deceleration Threshold Generation

As will be described in more detail below in connection with FIG. 3, the threshold generator 38 determines the value of the deceleration threshold DT with which the deceleration signal ω' is compared. The deceleration threshold DT represents the maximum deceleration that the wheel 20 is considered to be able to hold for a given set of conditions without incurring excessive skidding. As mentioned above, excessive skidding is considered to be when the wheel decelerates too quickly. Excessive skidding may be determined by differentiating the wheel speed to determine how fast the wheel speed is changing in a deceleration-based controller, for example. The particular value (or range of values) for the deceleration threshold DT is a design constant that is chosen a priori as a function of the wheel speed reference signal $\omega_{ref}$. In one embodiment, the deceleration values are contained in a look-up table. The look-up table values are chosen by trial and error, much in the same way that the proportional and integral gains of a traditional PI controller are determined. That is, a mathematical model of the aircraft and a landing scenario are used to do an evaluation of a particular set of deceleration thresholds DTs. For example, if the simulation shows excessive, repeated skidding at a particular aircraft speed, the deceleration threshold DT is reduced for the corresponding wheel speed reference signal $\omega_{ref}$. Conversely, if braking is slow to respond and efficiency is lost at a particular aircraft speed, the deceleration threshold DT for the corresponding wheel speed reference signal $\omega_{ref}$ is increased. In general, higher deceleration thresholds are required for higher wheel speed reference signals $\omega_{ref}$.

Ideally, the value of the deceleration threshold DT would only be a function of the maximum possible deceleration of the vehicle. In the case of the aircraft, the maximum possible deceleration may be 0.6 g. In reality, however, the rolling radius of the wheel is not precisely known due to variations in tire pressure, etc. (which affect wheel speed). In addition, noise may still be present in the measured wheel speed signal ω. Thus, the maximum value of deceleration threshold DT may be preselected as slightly greater than the theoretical value to prevent overaggressive control.

According to the present invention, the threshold generator 38 is represented by a look-up table including values of deceleration threshold DT as a function of the wheel speed reference signal $\omega_{ref}$ (described below). The wheel speed reference signal $\omega_{ref}$ represents the estimated speed of the vehicle. The wheel speed reference signal $\omega_{ref}$ is input to the threshold generator 38 and serves as an index to the look-up table therein to determine deceleration threshold DT as a function of the wheel speed reference signal $\omega_{ref}$. The values of deceleration threshold DT are predetermined based on the desired response characteristics of the antiskid brake controller 24. The values of deceleration threshold DT may be determined empirically, for example.

As mentioned above, the adder 36 compares the deceleration threshold DT with the deceleration signal ω'. The value of the deceleration signal ω' will be negative at times when the wheel 20 is decreasing in rotational speed, and will be positive when the rotational speed of the wheel 20 is increasing. The value of the deceleration threshold DT, on the other hand, will be positive. Both the deceleration signal ω' and the deceleration threshold DT are input to positive inputs of the adder 36 for comparison. As a result, if the deceleration of the wheel 20 exceeds the DT in the sense that the wheel 20 is decelerating at a rate greater than a rate of deceleration threshold DT, the output of the adder 36 will go negative (i.e., ω'+DT<0). On the other hand, if the deceleration of the wheel 20 is less than the deceleration threshold DT, the output of the adder 36 will go positive (i.e., ω'+DT>0).

The output of the adder 36 is input to a positive gain block 40 and a negative gain block 42. The outputs of the positive gain block 40 and the negative gain block 42 both ultimately lead to a limited integrator 44 included in the antiskid controller 24.

The gain blocks 40 and 42 leading to the limited integrator 44 are design parameters that add stability to the antiskid controller 24. If the output of the adder 36 was to pass directly to the limited integrator 44, the output of the antiskid controller 24 would tend to change nearly instantaneously from "1" to "0" or from "0" to "1". In order to avoid such a "bang-bang" effect, the input to the limited integrator 44 is scaled so the antiskid controller 24 output accumulates more smoothly. There are two gain terms instead of one (one for a positive error signal and the other for a negative error signal). This allows the antiskid controller 24 to decrease pressure applied to the brake assembly 18 more quickly than the antiskid controller 24 would increase the pressure.

Specifically, the output from the adder 36 is input to a positive limiter 46 which limits the positive error signal output from the adder 36 to within a predefined positive range (e.g., 0 to 10,000). The limited output from the positive limiter 46 is input to a positive gain amplifier 48 having a nominal gain of $2.5 \times 10_{-5}$, for example. The output of the positive gain amplifier 48 is provided ultimately to an input of an adder 50 representing the input of the limited integrator 44.

Regarding the negative gain block 42, the output from the adder 36 is also input to a negative limiter 52 which limits the negative error signal output from the adder 36 to within a predefined negative range (e.g., −1,000 to 0). The limited output from the negative limiter 52 is input to a negative gain amplifier 54 having a nominal gain of $13\times10^{-5}$, for example. The output of the negative gain amplifier 54 is provided ultimately to another input of the adder 50. It will be appreciated that the particular limits and gain values for the limiters and amplifiers described herein are merely exemplary. Such values are not intended to limit the scope of the invention.

The output of the adder 50 is provided to the input of a unitary limiter 56 included in the limited integrator 44. The unitary limiter 56 limits the output from the adder 50 to a value within a predefined positive range of "0" to "1" which, as will be appreciated, defines the range of the value of the output (i.e., interim antiskid control signal k) of the limited integrator 44.

Specifically, the output from the unitary limiter 56 is connected to a first terminal of a two-position switch SW1. An output at line 59 of an initial condition section 58 (described below) is input to a second terminal of the switch SW1. A RESET-bar signal is input to a control terminal of the switch SW1. The pole terminal of the switch SW1 represents the output of the limited integrator 44 at line 60. The output of the limited integrator 44 is fed back to a third input of the adder 50 via a delay block 62 as shown.

During normal operation (i.e., when the antiskid controller 24 is not being reset at startup or due to a detected lock-up condition as explained more fully below), the switch SW1 couples the output of the unitary limiter 56 to the limited integrator 44 output at line 60. Accordingly, if the estimated deceleration signal ω' generally remains below the deceleration threshold DT provided by the threshold generator 38 over a series of samples, the output of the limited integrator 44 will trend towards a value of "1". Similarly, if the deceleration signal ω' generally exceeds the deceleration threshold DT over a series of samples, the output of the limited integrator 44 will trend towards a value of "0". The particular rates at which the output of the limited integrator 44 trends up or down depends on the gain of the amplifiers 48 and 54, as well as, the value of deceleration signal ω' as will be appreciated.

Reduced Integral Gains for Low Output Values

As discussed above, the surface upon which the wheel 20 is rotating may be icy or wet, or the surface may be dry. In order to adapt better to such surface conditions, the antiskid controller 24 reduces integral gains when a low friction surface is encountered. In other words, the antiskid controller 24 will adapt or adjust the output of the antiskid controller 24 depending on the surface condition the wheel 20 is encountering. More particularly, the output of the antiskid controller 24 is reduced for low friction surfaces by applying a lower or reduced integral gain.

Specifically, the interim antiskid control signal k output by the limited integrator 44 is input to a reduced integral gain control block 64. More specifically, the interim antiskid control signal k of the limited integrator 44 is input to a first order, low pass filter 66 included in the reduced integral gain control block 64. The low pass filter 66 serves to average the value of the antiskid control signal k over a period of time. The filtered output of the low-pass filter 66 is then input to a comparator 68 included in the reduced integral gain control block 64. The comparator 68 compares the output of the low pass filter 66 to a predetermined threshold value input from a threshold block 70. The particular threshold value stored within the threshold block 70 represents a threshold value which the interim antiskid control signal k of the limited integrator 44, on average, will not rise above on low friction surfaces. Such threshold value may be calculated, determined empirically, etc. In the exemplary aspect, the threshold value in block 70 is "0.14", although it will be appreciated that other values may be used as a function of the parameters discussed herein.

The output of the comparator 68 is provided to a control terminal of a switch SW2. The switch SW2 controls the particular gain which is output by the reduced integral gain control block 64. During operation on normal surfaces (i.e., non-low friction surface), the reduced integral gain control block 64 provides a unity gain factor to the outputs of the positive and negative gain blocks 40 and 42. During operation on wet or icy surfaces (i.e., low friction surface), the reduced integral gain control block 64 provides a gain factor less than unity to the outputs of the positive and negative gain blocks 40 and 42 so as to scale down such outputs. Accordingly, an output of a unity gain block 72 is provided as an input to a first terminal of the switch SW2. The output of the unity gain block 72 is for normal surface conditions. An output of a gain block 74 is provided as an input to a second terminal of the switch SW2. The output of the gain block 74 is for low friction surface conditions such as the encountering of a low friction surface (e.g., ice). The gain block 74 may be preset to a value of "0.05", for example.

If the comparator 68 determines the output of the low pass filter 66 is less than the threshold value provided by the threshold block 70, it is judged that the wheel 20 must be on a low friction surface. In other words, the value of k has remained below 0.14 on average, which is indicative of a low friction surface condition as noted above. Under such condition, the comparator 68 outputs a control signal to the switch SW2 which connects the output of the gain block 74 to the pole terminal of the switch SW2. Thus, the low friction surface gain factor of "0.05" is provided as the output of the reduced integral gain control block 64.

If the output of the low pass filter 66 is not below the threshold value from block 70, the comparator 68 outputs a control signal to the switch SW2 which connects the output of the unity gain block 72 to the pole terminal of the switch SW2. Thus, the normal surface condition gain factor of "1" is provided as the output of the reduced integral gain control block 64.

The output of the reduced integral gain control block 64 is provided as an input to multipliers 76 and 78 included in the antiskid controller 24. More specifically, the output of the reduced integral gain control block 64 is input into one input of the multiplier 76. The output of the positive gain amplifier 48 of the positive gain block 40 is provided to the other input of the multiplier 76. The multiplier 76 thereby scales the output of the positive gain block 40 by the gain input from the reduced integral gain control block 64. Thus, the output of the reduced integral gain control block 64 adapts the affect of the deceleration threshold DT to the surface condition being encountered. The output of the multiplier 76 is then input to the adder 50.

The output of the reduced integral gain control block 64 is also input to one input of the multiplier 78. The output of the negative gain amplifier 54 is provided to another input of the multiplier 78. The output of the reduced integral gain control block 64 scales the output of the negative gain block 42 similar to the case of the positive gain block 40. The output of the multiplier 78 is similarly provided to an input of the adder 50.

By reducing the integral gains during low friction surface conditions, the controller 24 adjusts the value of k' less rapidly. This increases the likelihood that braking can be continued without incurring a skid event.

Proportional Gain in Antiskid Controller

The antiskid controller 24 in the exemplary aspect also includes adding a proportional gain to the output of the limited integrator 44. The proportional gain increases the response time of the brake controller. However, those skilled in the art will understand that care must be taken not to use too large a proportional gain value and thereby maintain system stability.

Continuing to refer to FIG. 2, the output from the adder 36 is also input into a proportional gain block 80. The proportional gain block 80 includes a proportional gain amplifier 82. The proportional gain amplifier 82 scales the signal output from the adder 36 by a proportional amount.

The proportionally scaled output of the proportional gain amplifier 82 is provided to an input of an adder 84. The output of the limited integrator 44 at line 60 is provided to another input of the adder 84. The adder 84 adds the proportionally scaled output of the proportional gain amplifier 82 to the interim antiskid controller signal k. The interim antiskid controller signal k is thus increased by the proportional gain. The output of the adder 84 is input to a unitary limiter 86 which limits the output from the adder 84 to a value within a predefined positive range (e.g., "0" to "1"). The limited output from the unitary limiter 86 represents the antiskid control signal k' that is output by the antiskid controller 24 for scaling the brake control signal $T_{output}$.

The antiskid controller 24 further includes a wheel reference generator 88. The wheel reference generator 88 receives as an input the ENABLE signal from the brake controller 14. As will be described more fully below in connection with FIG. 4, the wheel reference generator 88 includes a rate limiter that operates based on the maximum rate at which the vehicle (e.g., the aircraft) could physically decelerate. Specifically, the wheel reference generator 88 provides a wheel speed reference signal $\omega_{ref}$ that represents the estimated speed of the vehicle. The rate at which the wheel speed reference signal $\omega_{ref}$ can vary is limited by the theoretical maximum rate at which the vehicle itself can be decelerated. Such theoretical maximum rate can be calculated based on known physical properties of the vehicle (e.g., mass, etc.).

The wheel speed reference signal $\omega_{ref}$ is used in the antiskid controller's 24 "dump" logic circuit in order to determine when a skid has occurred and when to reset the antiskid controller 24. Specifically, the wheel speed reference signal $\omega_{ref}$ from the wheel reference generator 88 is input under normal operating conditions to an amplifier 90 having a gain less than one (e.g., 0.7). The output of the amplifier 90 is input via a switch SW3 to a comparator 92 included in the antiskid controller 24. Also input to the comparator 92 is the measured wheel speed signal ω from the wheel speed sensor 22 (FIG. 1).

The comparator 92 is configured to compare the measured wheel speed signal ω to the wheel speed reference signal $\omega_{ref}$. If the measured wheel speed signal ω is less than the wheel speed reference signal $\omega_{ref}$ by a predetermined amount (e.g., 30% as determined by the gain of the amplifier 90), it is judged that the wheel 20 must be in lock-up condition since the wheel 20 could not have decelerated so quickly without incurring lock-up. Under such condition, the comparator 92 outputs an active DUMP-bar signal having a logic value of "0". Otherwise, if the measured wheel speed ω does not fall below the wheel speed reference signal $\omega_{ref}$ by the predetermined amount, the comparator 92 outputs a DUMP-bar signal having a logic value of "1".

The DUMP-bar signal from the comparator 92 is provided to an input of a two-input AND gate 98. The other input of the AND gate 98 is coupled to the aforementioned ENABLE signal which is active (i.e., a logic "1") during a braking event. If during a braking event a lock-up condition occurs as determined by the comparator 92, the output of the AND gate 98 will be low providing as an output signal an active RESET-bar signal equal to a logic "0". The RESET-bar signal, as mentioned above, serves as a control signal to the switch SW1 to determine the position thereof. Specifically, when the RESET-bar signal is non-active (i.e., a logic "1"), the switch SW1 is in its normal position for connecting the output of the unitary limiter 56 to the output line 60 of the limited integrator 44. On the other hand, when the RESET-bar signal is active (i.e., a logic "0"), the switch SW1 disconnects the output of the unitary limiter 56 from the output line 60. Connected to the other terminal of the switch SW1 is the output of the initial condition section 58, included in the antiskid controller 24. When the RESET-bar signal is active, the switch SW1 connects the output of the initial condition section 58 to the output line 60 of the limited integrator 44. In the event of a lock-up condition during a braking event when the DUMP-bar signal is active, the output signal of the initial condition section 58 is set equal to a logic "0". Consequently, the output of the limited integrator 44 is reset as the interim antiskid control signal k goes to "0" and the brake pressure is released or "dumped". Following the dumping of brake pressure, the output of the limited integrator is reset as is described in more detail below.

Hysteresis in Pressure "Dump" Logic

Hysteresis is also included in the pressure "dump" logic of the antiskid controller 24. Specifically, under normal conditions, the normal condition gain of the amplifier 90 is used with the wheel speed reference signal $\omega_{ref}$. However, if a lock-up condition occurs as described above, a higher gain is used with the wheel speed reference signal $\omega_{ref}$ to determine when to reset the antiskid controller 24 (i.e., the DUMP-bar signal).

The output of the comparator 92 (i.e., the DUMP-bar signal) is fed back to a control terminal of a switch SW3. The output of the amplifier 90 is input to a first terminal of the switch SW3. Coupled to a second terminal of the switch SW3 is an amplifier 94. The amplifier 94 has a gain greater than the gain of the amplifier 90, but still less than "1" (e.g., 0.9). The wheel speed reference signal $\omega_{ref}$ from the wheel reference generator 88 is also provided as an input to the amplifier 94.

When there is no pressure "dump" condition, i.e., no skid has occurred, the DUMP-bar signal is equal to a logic "1". In turn, the switch SW3 couples the output of the amplifier 90 to the comparator 92. Thus, the gain of the amplifier 90 is used to determine when a skid has occurred. However, when a "dump" condition does occur, i.e., the DUMP-bar signal equals a logic "0". This causes the switch SW3 to couple the output of the amplifier 94 to the comparator 92. As a result, the DUMP-bar signal will not return to a logic "1" until the measured wheel speed ω becomes greater than 0.9 of the wheel speed reference signal $\omega_{ref}$. The higher gain of the amplifier 94 helps to ensure that the wheel 20 will spin back up to synchronous before pressure is reapplied to the brake assembly 18 (FIG. 1).

The output of the comparator 92 is also fed back to the wheel reference generator 88 via a delay block 96 as shown in FIG. 2. The function of the output fed back through the delay block 96 will be described in detail with reference to the operation of the wheel reference generator 88 described in reference to FIG. 4 below.

After "Dump" Partial Reset

The initial condition section 58, included in the antiskid controller 24, includes a two-position switch SW4 having its pole terminal connected to one input of the switch SW1 via line 59. Connected to one terminal of the switch SW4 is an initial condition value of Y=0, represented by a block 100. The pole terminal of a switch SW5 is connected to the other terminal of the switch SW4. The operation of the switch SW5 will be described below. Connected to one terminal of the switch SW5 is an amplifier 102 having a predefined reset gain less than unity, e.g., 0.75. The interim output k of the limited integrator 44 as fed through the delay block 62 is provided as an input to the amplifier 102. Connected to the other terminal of the switch SW5 is an initialization block 103 having a predefined gain, for example, "1". Connected to the control terminal of the switch SW5 is the output of the AND gate 98 (i.e., the RESET-bar signal).

The position of the switch SW4 is controlled by the value of the DUMP-bar signal. When the DUMP-bar is active (i.e., a logic "0"), the switch SW4 couples the value of Y=0 to the input of the switch SW1 as previously mentioned. However when the DUMP-bar is non-active (i.e., a logic "1"), the switch SW4 couples the value of the pole terminal of the switch SW5 to the input of the switch SW1.

When a skid has occurred, it is desirable to set the initial condition section 58 to a value less than 100 percent (100%), for example, 75 percent (75%). Seventy-five percent (75%) of the interim antiskid control signal k value before the skid occurs is used as the value at which the unitary limiter 56 is reset after the skid condition is resolved. If reset to 100 percent (100%) of the preskid value, then the brake pressure applied would be the same brake pressure applied when the skid occurred. This prevents excessive brake pressure from being reapplied to the wheel 20, thereby prolonging the skidding event.

During a skidding event, the DUMP-bar is non-active (i.e., a logic "1"). Thus, the switch SW4 couples the value of the pole terminal of the switch SW5 to the input of the switch SW1. At the same time since a braking event is occurring, the ENABLE signal input to the control terminal of the switch SW5 will be a logic "1". Thus, the switch SW5 couples the reset value of the amplifier 102 (i.e., 75 percent (75%)) to the input of the switch SW4. Additionally, the RESET-bar signal will go active causing the switch SW1 to couple the reset value of 75 percent (75%) to the output of the limited integrator 44 on line 60. As a result during a skidding event, the output of the limited integrator 44 will be interim antiskid control signal k=0.75. Thus, the reset value is passed through the switch SW1 and output to the adder 84. Therefore, the output of the unitary limiter 86 (i.e., antiskid control signal k') will thereby be reduced as a function of the reset value.

However during startup or initialization of the antiskid controller 24 prior to any braking event, it is desirable to initialize the limited integrator 44 by setting its output equal to a logic "1". Since no skidding event has occurred, the antiskid controller 24 is defaulted to engage a dry runway. Thus, full pilot command pressure is the default setting. During startup or initialization (i.e., prior to a braking event), the DUMP-bar is non-active (i.e., a logic "1"). At the same time since a braking event is not yet occurring, the ENABLE signal input to the control terminal of the switch SW5 will be a logic "0". Thus, the switch SW5 couples the initialization value of the initialization block 103 (i.e., logic "1") to the input of the switch SW4. Additionally, the RESET-bar signal will go active since the ENABLE signal input to the AND gate 98 will be a logic "0". The active RESET-bar signal causes the switch SW1 to couple the initialization value of a logic "1" to the output of the limited integrator 44 on line 60. As a result during initialization, the output of the limited integrator 44 will be interim antiskid control signal k="1".

Figure 3:
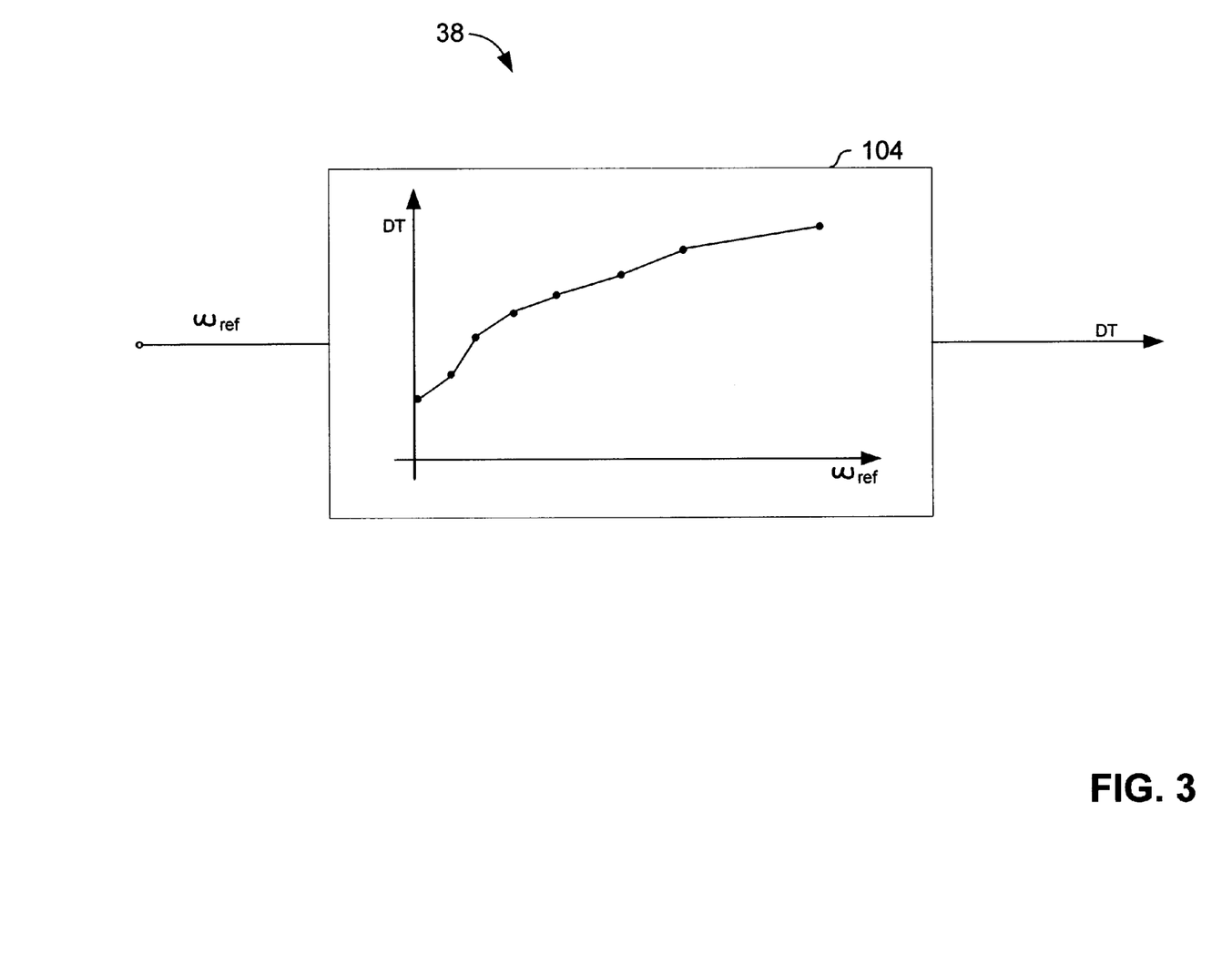
FIG. 3 is a functional diagram of the adaptive deceleration threshold generator included in the antiskid controller in accordance with the present invention.

Turning now to FIG. 3, the operation of the threshold generator 38 will be described in detail. The threshold generator 38 is made up of a look-up table that produces values for the deceleration threshold DT as a function of the wheel speed reference signal $\omega_{ref}$. The wheel speed reference signal $\omega_{ref}$ is provided as the output of the wheel reference generator 88 (FIG. 2). The wheel speed reference signal $\omega_{ref}$ is input to a look-up table represented by a block 104 included in the threshold generator 38. The values of the look-up table may be based on the desired response characteristics of the antiskid controller 24. The values may be predetermined. For example, the look-up table values may be chosen by trial and error as described above. That is, a mathematical model of the aircraft and a landing scenario are used to do an evaluation of a particular set of deceleration thresholds DTs. If the simulation shows excessive, repeated skidding at a particular aircraft speed, the deceleration threshold DT is reduced for the corresponding wheel speed reference signal $\omega_{ref}$. Conversely, if braking is slow to respond and efficiency is lost at a particular aircraft speed, the deceleration threshold DT for the corresponding wheel speed reference signal $\omega_{ref}$ is increased. In general, higher deceleration thresholds are required for higher wheel speed reference signals $\omega_{ref}$.

As will be appreciated, the threshold generator 38 produces the value of the deceleration threshold DT to reflect the inability of the wheel 20 to hold the current amount of deceleration. Conversely, if the value of wheel speed reference signal $\omega_{ref}$ increases, the threshold generator 38 increases the value of the deceleration threshold DT to reflect the ability of the wheel 20 to hold the current amount of deceleration.

The wheel speed reference signal $\omega_{ref}$ to deceleration threshold DT look-up table is composed of a series of data points. The data may be integrated to fit the data to a curve. The data may be interpolated to produce the best curve fit. The slope of the data points increase from left to right. The slope is associated with an increase in the wheel speed reference signal $\omega_{ref}$. The slope increases at a greater rate for lower wheel speed reference signal $\omega_{ref}$ values and increases at a lower rate for higher wheel speed reference signal $\omega_{ref}$ values. It should be understood by those skilled in the art that other shapes of the look-up table will result depending on the values of the wheel speed reference signal $\omega_{ref}$ for a given deceleration threshold DT. The wheel speed reference signals $\omega_{ref}$ correspond to a predefined deceleration threshold DT value. The predefined deceleration threshold DT value has been determined based on the output characteristics desired for the antiskid controller 24 for a given wheel speed reference signal $\omega_{ref}$.

In the exemplary aspect, if the wheel speed reference signal $\omega_{ref}$ increases, then the threshold generator 38 will gradually increase the value of deceleration threshold DT. If the wheel speed reference signal $\omega_{ref}$ decreases, then the threshold generator 38 will more rapidly decrease the value of deceleration threshold DT. If the wheel speed reference signal $\omega_{ref}$ remains unchanged, the value of the deceleration threshold DT is left unchanged. The particular limits for the deceleration threshold DT may be determined empirically, for example.

Figure 4:
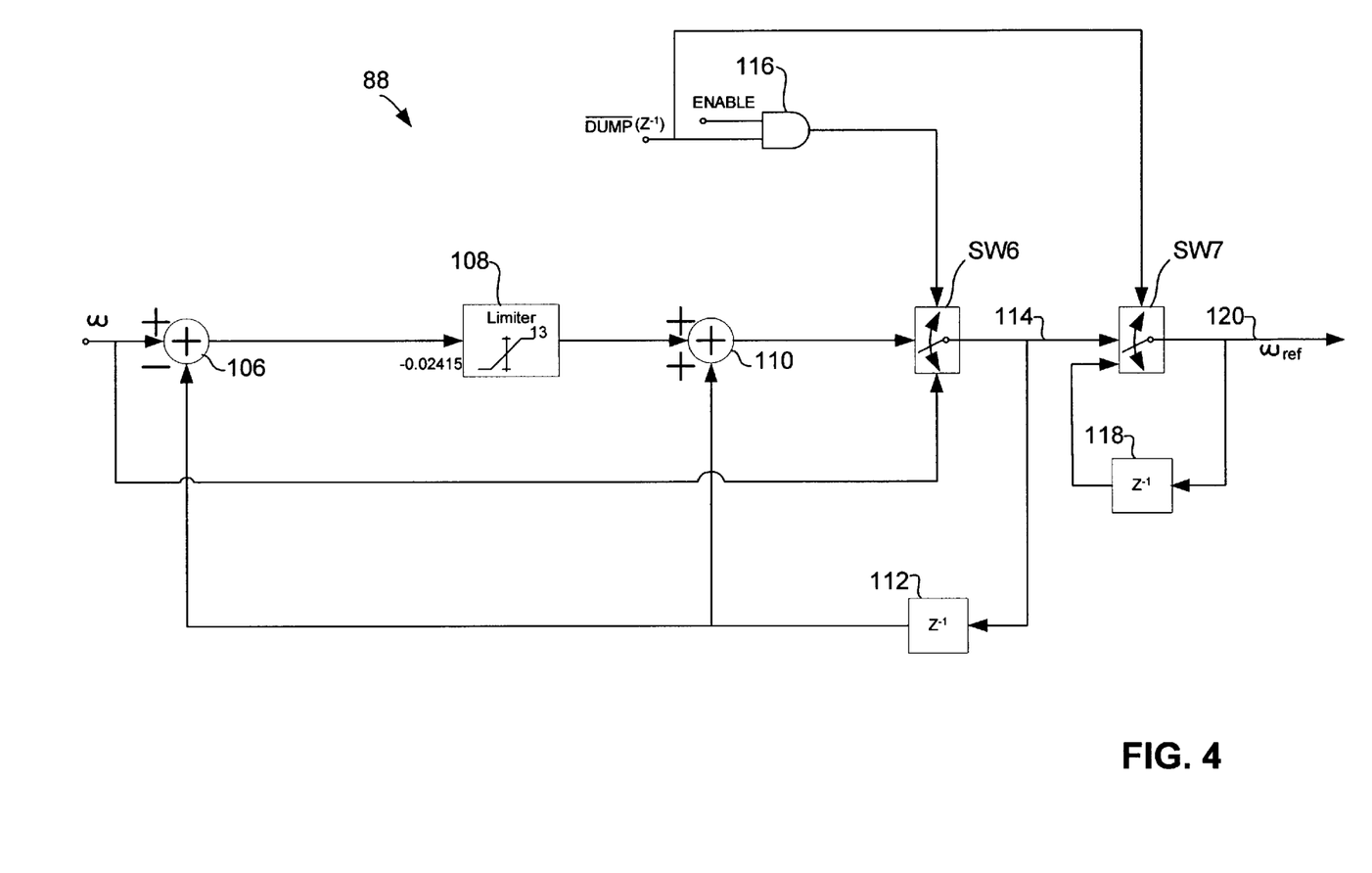
FIG. 4 is a detailed block diagram of the wheel reference generator included in the antiskid controller in accordance with the present invention.

Turning now to FIG. 4, a detailed diagram of the wheel reference generator 88 is shown. As described previously, the wheel reference generator 88 produces a wheel speed reference signal $\omega_{ref}$ limited by the maximum rate at which the vehicle could physically decelerate. The measured wheel speed signal $\omega$ from the wheel speed sensor 22 is input to an adder 106 included in the wheel reference generator 88. The output of the adder 106 is input to a limiter 108. The upper limit of the limiter 108 is a predetermined relatively large value (e.g., 13) that will in essence allow the wheel speed reference signal $\omega_{ref}$ to increase quickly upon spin-up of the wheel 20 as is desirable.

The lower limit of the limiter 108, on the other hand, is a predetermined value chosen to reflect the maximum rate at which the vehicle (e.g., the aircraft) physically could decelerate. Assuming the aircraft in the exemplary aspect could physically be decelerated at a maximum rate of 0.6 g, and a given sample period of the antiskid controller 24 is 0.00125 second, the lower limit of the limiter 108 is set to −0.02415, for example, keeping in mind the relationship between the angular velocity of the wheel 20 and the linear velocity of the aircraft.

The output of the limiter 108 is input to another adder 110. The output of the adder 110 is provided to one terminal of a switch SW6 included in the wheel reference generator 88. The measured wheel speed signal $\omega$ from the wheel speed sensor 22 is input directly into another terminal of the switch SW3. The position of the switch SW6 determines whether the rate limited value of the measured wheel speed $\omega$ or the measured wheel speed signal $\omega$ itself is fed back through a delay block 112 to the adders 106 and 110. Specifically, the pole of the switch SW6 on line 114 is connected to the input of the delay block 112. The output of the delay block 112 is coupled to a positive input of the adder 110 and to a negative input of the adder 106.

The position of the switch SW6 is controlled by the output of a two-input AND gate 116. When the output of the AND gate 116 is a logic "1", the switch SW6 couples the output on line 114 to the output of the adder 110. On the other hand, when the output of the AND gate 116 is a logic "0", the switch SW6 couples the output on line 114 to the measured wheel speed signal $\omega$ itself. One input of the AND gate 116 is the ENABLE signal provided by the brake controller 14 (FIG. 1) and which is active (i.e., ENABLE=1) during a braking event. The other input to the AND gate 116 is the delayed DUMP-bar signal provided to the wheel reference generator 88 from the output of the delay block 96 (FIG. 2).

The output from the switch SW6 on line 114 is also input to one terminal of a second switch SW7 included in the wheel reference generator 88. The other terminal of the switch SW7 is coupled to the output of a delay block 118. The pole terminal of the switch SW7 is coupled to output line 120 that provides the output signal of the wheel reference generator 88 as the wheel speed reference signal $\omega_{ref}$. As shown, the output on line 120 is also coupled to the input of the delay block 118. The position of the switch SW7 is controlled by the delayed DUMP-bar signal provided by the delay block 96 (FIG. 2). When the delayed DUMP-bar signal is non-active (i.e., a logic "1"), the switch SW7 couples the output on line 114 to line 120. If the delayed DUMP-bar signal goes active (i.e., a logic "0") on the other hand, the switch SW7 couples the output of the delay block 118 to line 120.

Accordingly, during a normal braking event when the DUMP-bar signal is non-active, the rate limited wheel speed provided by the limiter 108 is output by the wheel reference generator 88 as the wheel speed reference signal $\omega_{ref}$. In the event a lock-up condition is detected and the DUMP-bar signal goes active during a braking event, the switch SW6 couples the measured wheel speed signal $\omega$ to the output line 114 and couples the output on line 114 via the switch SW7 to the output on line 120 as the wheel speed reference signal $\omega_{ref}$. The switch SW7, in turn, causes the value of the wheel speed reference signal $\omega_{ref}$ output on line 120 to be fed back through the delay block 118. As a result, during a "dump" of brake pressure when the DUMP-bar signal is active, the wheel speed reference signal $\omega_{ref}$ on line 120 is held at the value of the measured wheel speed signal $\omega$ at the beginning of the "dump".

During a "dump", the measured wheel speed signal $\omega$ will increase as a result of the wheel 20 spinning up following the release of brake pressure. The comparator 92 (FIG. 2) will detect when the measured wheel speed $\omega$ increases to within the predefined fraction, e.g., "0.9", of the measured wheel speed signal $\omega$ at the beginning of the "dump". At such time, the DUMP-bar signal will go inactive indicating the end of the "dump" or brake pressure release. The measured wheel speed signal $\omega$ at the end of the "dump" is held by the delay block 112 and is fed back to the adders 106 and 110. Consequently, the measured wheel speed signal $\omega$ at the end of the "dump" serves initially as the wheel speed reference signal $\omega_{ref}$. Furthermore, during a non-braking event when the ENABLE signal is a logic "0", the wheel speed reference signal $\omega_{ref}$ is initially set to the measured wheel speed signal $\omega$ by virtue of the switches SW6 and SW7.

Force Limit Applied to Brake Controller

Figure 5:
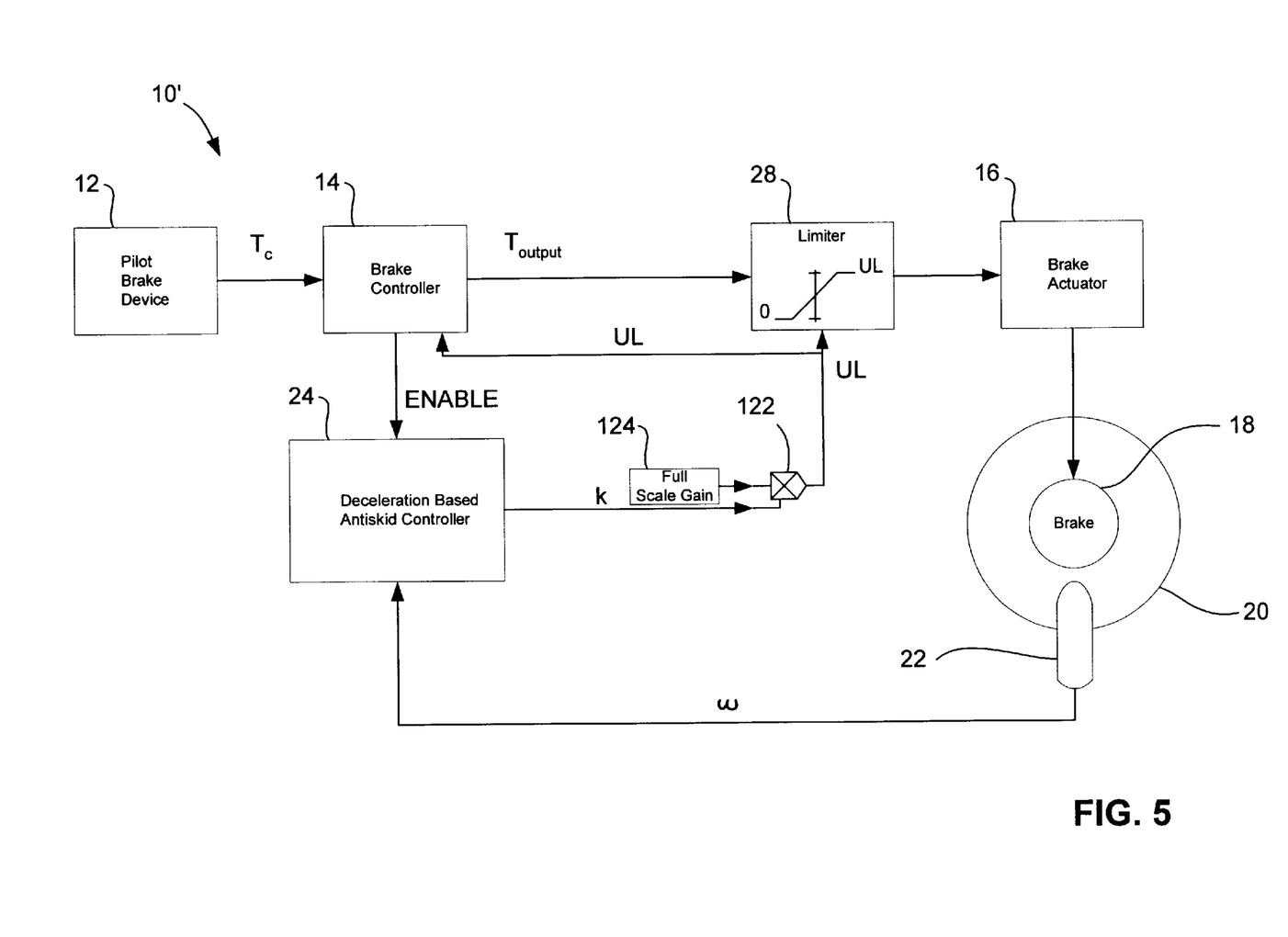
FIG. 5 is a block diagram of a brake system in accordance with another aspect of the invention.

Referring briefly to FIG. 5, another aspect of the brake control system, denoted 10', is shown in accordance with the present invention. In this aspect, the antiskid control signal k adjusts the brake force applied to the wheel 20 by controlling the limits of a limiter 28 and the brake controller 14. The limiter 28 receives as one input the brake control signal $T_{output}$ from the brake controller 14. The antiskid control signal k is input to the other input of the limiter 28. The limited output of limiter 28 is input to the brake actuator 16.

The brake controller 14 contains an integrator that must be limited by the output on UL. The antiskid control signal k is input into the brake controller 14 and to the other input of the limiter 28 rather than by directly scaling the brake control signal $T_{output}$ as in the aspect of FIG. 1.

More specifically, the antiskid control signal k from the antiskid controller 24 is provided to an input of a multiplier 122. The multiplier 122 receives at its other input, a nominal upper limit for the limiter 28 and the integrator of the brake controller 14, as represented by a full scale gain block 124. The full scale gain or upper limit may be 3,000, for example, and such value may be input to the multiplier 122 from the full scale gain block 124. The multiplier 122 scales the full gain value by a factor, i.e., the antiskid control signal k, to produce an upper limit (UL) for the output signal that is output by a limiter 28. The limiter 28 is designed to use, as its upper limit, the current value of UL as provided by the multiplier 122.

As mentioned above, the brake controller 14 may contain an integrator, the output of which is $T_{output}$. If the antiskid controller 24 limits brake application via the limiter 28 and the brake controller 14 measures a brake pressure less than what the pilot is requesting, the brake controller integrator of brake controller 14 will start to diverge if it has no knowledge of the upper limit UL. Therefore, UL is provided to the integrator of the brake controller 14 to prevent the integrator from diverging during an antiskid event.

Accordingly, as the value of antiskid control signal k varies from "0" to "1" as described above, the maximum brake control signal that is passed on to the brake actuator 16 is controlled. It has been found that control of the upper limit (UL) of the limiter 28, based on the value of antiskid control signal k, provides smooth antiskid control. Additionally, the upper limit of the limiter 28 prevents damage to the tire.

In view of the above, it will be appreciated that the antiskid brake controller 24 of the present invention utilizes measured wheel speed ω in order to provide brake control for a vehicle, such as an aircraft. The measured wheel speed ω is differentiated to determine the deceleration of the wheel 20, and the controller then compares the deceleration to the deceleration threshold DT. If the wheel decelerates faster than the deceleration threshold DT, the controller reduces the pilot commanded pressure provided to the brakes by a scaling factor. Full pilot commanded pressure might eventually be applied otherwise. The controller is capable of operating based only on measured wheel speed, thus additional sensors are not necessary.

Although the invention has been shown and described with respect to certain preferred aspects, it is obvious that equivalents and modifications will occur to others skilled in the art upon the reading and understanding of the specification. For example, the invention has been described in relation to a brake-by-wire system wherein the depression of the pedal is converted to an electrical signal. It should be understood by those skilled in the art that in a more conventional braking system, pedal depression controls brake pressure via a master cylinder and the antiskid pressure is introduced by separate antiskid valve. Essentially, the multiplier 26 in FIG. 1 and the limiter 28 in FIG. 5 become dedicated antiskid valves in the master cylinder/ conventional braking system. The present invention includes all such equivalents and modifications, and is limited only by the scope of the following claims.

What is claimed is:

1. An antiskid brake controller for controlling a braking operation of a wheel of a vehicle based on a wheel speed signal provided by a wheel speed sensor coupled to the wheel, the antiskid brake controller comprising:
   a deceleration estimator for estimating a deceleration of the wheel based on the wheel speed signal provided by the wheel speed sensor; and
   a deceleration threshold generator that selects a deceleration threshold value from a look-up table based on the ability of the wheel to hold a pilot commanded brake pressure without excessive skidding,
   the selected deceleration threshold value being summed with the deceleration estimate to produce a control signal for adjusting a brake force applied to the wheel.

2. The controller of claim 1, wherein a selected deceleration threshold value is a function of a wheel speed reference signal $\omega_{ref}$.

3. The controller of claim 2, wherein the wheel reference the signal $\omega_{ref}$ is fed into the deceleration threshold generator to determined the deceleration threshold value based on the desired response characteristics of the antiskid controller.

4. The controller of claim 1, further including:
   a reduced integral gain block which outputs a gain that adapts the deceleration threshold to a surface condition by increasing or decreasing the deceleration threshold based on selecting a gain appropriate for the type of surface a wheel is decelerating upon.

5. The controller of claim 1, wherein an output of the antiskid brake controller is used as an upper limit of a limiter of a brake controller in order to prevent damage to a tire.

6. An antiskid brake controller adaptive to a surface condition is provided for controlling a braking operation of a wheel of a vehicle based on a wheel speed signal provided by a wheel speed sensor coupled to the wheel, the antiskid brake controller comprising:
   a deceleration estimator for estimating a deceleration of the wheel based on the wheel speed signal provided by the wheel speed sensor;
   a deceleration threshold generator that selects a deceleration threshold value based on the ability of the wheel to hold a pilot commanded brake pressure without excessive skidding;
   the selected deceleration threshold value is summed with the deceleration estimate to produce a control signal for adjusting a brake force applied to the wheel; and
   a reduced integral gain controller for comparing the control signal to a predetermined threshold value to determine the gain to be applied to the control signal, the gain increasing or decreasing the control signal as a function of the surface condition.

7. The controller of claim 6, wherein the predetermined threshold value indicates a low friction surface has been encountered; and
   the reduced integral gain control block outputs a gain lower than an initial gain wherein the lower gain adapts the antiskid control signal k output of the antiskid brake controller for the low friction surface being encountered.

8. An antiskid brake controller for controlling a braking operation of a wheel of a vehicle based on a wheel speed signal provided by a wheel speed sensor coupled to the wheel, the antiskid brake controller comprising:
   a deceleration estimator for estimating a deceleration of the wheel based on the wheel speed signal provided by the wheel speed sensor;
   a deceleration threshold generator that provides a deceleration threshold value based on the ability of the wheel to hold a pilot commanded brake pressure without excessive skidding;
   the selected deceleration threshold value is summed with the deceleration estimate with to produce a control signal for adjusting a brake force applied to the wheel; and
   a proportional gain controller for adding a proportional gain to the control signal;
   the proportional gain being added to the control signal to increase a response time of the antiskid brake controller.

9. An antiskid brake controller for controlling a braking operation of a wheel of a vehicle based on a wheel speed signal provided by a wheel speed sensor coupled to the wheel, the antiskid brake controller comprising:
   a reset circuit that resets the output of the antiskid controller following a wheel lock-up condition to a percentage less than 100 percent of the output of the antiskid controller prior to the wheel lock-up condition in order to prevent excessive brake pressure from being applied to a wheel.

10. An antiskid brake controller for controlling a braking operation of a wheel of a vehicle based on a wheel speed signal provided by a wheel speed sensor coupled to the wheel, the antiskid brake controller comprising:

a pressure "dump" circuit including a normal condition gain input and higher gain input, wherein the higher gain input is used with a wheel speed reference signal $\omega_{ref}$ following a wheel lock-up condition to determine when to reset the antiskid controller after the wheel lock-up event has occurred, thereby allowing the wheel to spin back up to synchronous before resetting the antiskid controller.

11. The controller of claim 10, wherein the higher gain input is greater than the normal condition gain, but less than "1".

* * * * *